(12) United States Patent
Zhao et al.

(10) Patent No.: US 8,068,531 B2
(45) Date of Patent: Nov. 29, 2011

(54) METHOD AND APPARATUS FOR ELIMINATING NARROW BAND INTERFERENCE BY MEANS OF WINDOWING PROCESSING IN SPREAD SPECTRUM SYSTEM

(75) Inventors: Meng Zhao, Guangdong Province (CN); Jiying Xiang, Guangdong Province (CN); Chunbo Yao, Guangdong Province (CN)

(73) Assignee: ZTE Corporation, Guandong (CN)

( * ) Notice: Subject to any disclaimer, the term of this patent is extended or adjusted under 35 U.S.C. 154(b) by 716 days.

(21) Appl. No.: 12/096,051

(22) PCT Filed: Dec. 16, 2005

(86) PCT No.: PCT/CN2005/002223
§ 371 (c)(1),
(2), (4) Date: Jun. 4, 2008

(87) PCT Pub. No.: WO2007/068146
PCT Pub. Date: Jun. 21, 2007

(65) Prior Publication Data
US 2008/0279256 A1    Nov. 13, 2008

(51) Int. Cl.
*H04B 1/00* (2006.01)
(52) U.S. Cl. ........ 375/130; 329/318; 329/349; 332/107; 375/148; 375/346; 455/63.1
(58) Field of Classification Search .............. None
See application file for complete search history.

(56) References Cited

U.S. PATENT DOCUMENTS 5,612,978 A * 3/1997 Blanchard et al. ............ 375/350
6,868,114 B2 * 3/2005 Bially et al. .................. 375/148

FOREIGN PATENT DOCUMENTS

| EP | 1 176 731 A1 | 1/2002 |
| WO | 02/091610 A | 11/2002 |
| WO | 2005/107088 A | 11/2005 |
| WO | 2006/092093 A | 9/2006 |

OTHER PUBLICATIONS

European Search Report in corresponding EPO Application, Application No. EP 05 82 3414, mailed Mar. 4, 2010.

* cited by examiner

*Primary Examiner* — David C. Payne
*Assistant Examiner* — Adolf Dsouza
(74) *Attorney, Agent, or Firm* — Banner & Witcoff, Ltd.

(57) ABSTRACT

A device and method for eliminating narrow-band interference by windowing in a spread spectrum system are disclosed. The method comprises extracting N sampling points of data to perform frequency spectrum transform each time and obtaining N points of data; updating control information, comparing the energy values of the N points with the threshold within the set time period to determine the number of narrow-band interference as well as the width and location of the interference; determining the corresponding frequency domain adjusting window based on the width and location of the narrow band interference, obtaining the points within the window and the adjusted values of those points; with regard to the transformed N points during interference elimination process, setting the energy values of the points within the window during the current time period and the last period as the corresponding adjusted values, outputting the points after frequency spectrum inverse transform.

9 Claims, 2 Drawing Sheets

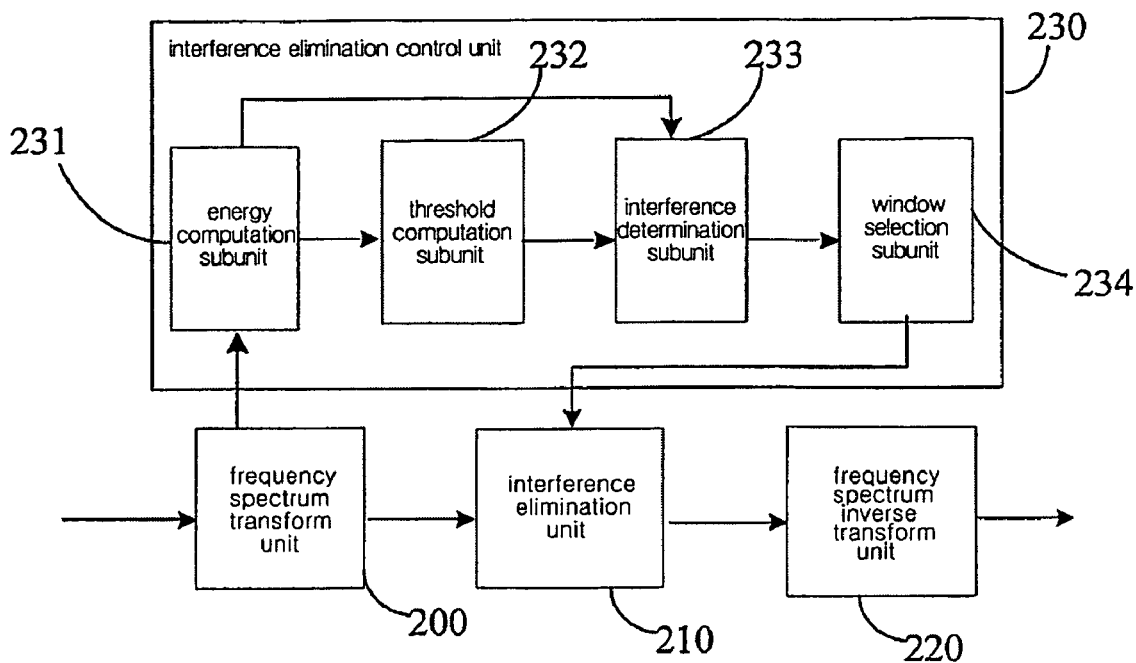
fig. 3
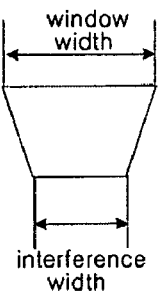 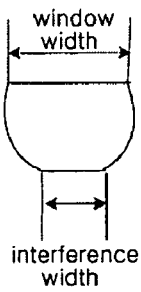
fig. 4A        fig. 4B

METHOD AND APPARATUS FOR ELIMINATING NARROW BAND INTERFERENCE BY MEANS OF WINDOWING PROCESSING IN SPREAD SPECTRUM SYSTEM

TECHNICAL FIELD

The present invention pertains to a method and device for eliminating narrow-band interference in a wireless communications, specifically refers to a method and device for eliminating narrow-band interference in a spread spectrum communication system.

TECHNOLOGY BACKGROUND

Spread spectrum communication system is widely used nowadays. The spread spectrum or the pseudo-random (PN) code modulation can reduce the interference from other users and wireless signals. During the cross-correlation process of received signals and PN sequence, when the interference is narrow-band signals, the interference signals will spread to the entire band and thus weaken the impact of the interference. As a result, the spread spectrum signals can weaken the narrow-band interference to some extend.

A typical spectrum of a spread spectrum signal (e.g. performing spread spectrum from PN sequence) is submerged in the noise as shown in FIG. 1. An ideal signal is the signal energy that is actually sent out by the mobile station and the noise is the additive interference. Obviously, the ideal signal energy of the spread spectrum is usually less than the noise energy. "Strong interference" generally refers to the blocking signals or the signals that are sent by TV, wireless station and nearby communication equipments. "Typical interference" refers to the signals sent by those low-power sources, such as amateur radio. Processing gain represents the interference signal levels tolerable by the spread signals in mobile stations. The spread signals can still be recovered when they are affected by the typical interference, but they will never be recovered when the strong interference shows up. What's more, even with the typical interference, the signals can be recovered but the system performance will degrade.

Before utilizing CDMA communication system, the frequency band will be swept in order to protect the CDMA signals from the interference of narrow-band signals. However, since some burst signals are hard to be fully forbidden due to the burst characteristic, the narrow-band interference will present disorder and randomicity. The narrow-band interference will increase the congestion rate and call-dropping rate in a CDMA system, as well as overload the radio-frequency power control system, increase the power consumption of mobile station, and reduce base station coverage. Under extreme situation, the high-power interference will even block the entire cell, and thus the normal communication will stop. As a result, we must find a good solution in order to eliminate the impact of the narrow-band interference signals pushing on the CDMA signals and guarantee a good communication quality.

Generally, the methods for dealing with narrow-band interference are divided into two categories:

The first category is to make the signal (usually under analog processing) pass through a narrow-band notch filter or a filter group. This method is usually realized by the surface acoustic technology, which makes estimation for the frequency of interference signals and places the narrow-band notch filter wherever the narrow-band interference signals exist based on the estimation result. (PLL (Phase Locked Loop) can also be used to track the narrow-band interference signals). However, the analog technology has its own limitations, and usually lacks flexibility.

Another category is frequency domain elimination which is generally realized through digital processing. Signals are first digitized and then transformed into frequency domain through Fourier Transform. These data will be processed in the frequency domain and finally be transformed back into the time domain to be output through inverse-Fourier Transform. The methods for processing interference signals in the frequency domain can be concluded into two categories: the first method is to filter out the interference impact through the filter on the frequency domain data and this method is suitable to the case that the bandwidth and location of the interference are already known, but this method will have a certain limitation when the location of the interference in the frequency domain, the bandwidth and the number of the interference are hard to identify, since there is a certain degree of difficulty in designing a fully adaptive filter.

Another method is to compute the signal amplitude on each frequency point and then compare them with a threshold value. The signals exceeding the threshold values will be set as zero or be degraded to noise level. This method can adaptively process multiple narrow-band interferences, multiple interference bandwidths and interference frequency changes. However this method only processes the data that exceed the threshold, and in a practical system, the part of the frequency spectrum with interference will leak to the neighbor frequency points because of some factors such as the selection for the number of the points of Fourier Transform. If the impact of spectrum leakage on the capability for suppressing narrow-band interference is totally ignored, as the result, the capability for suppressing narrow-band interference can not meet the requirements of the system.

SUMMARY OF THE INVENTION

The technical problem that needs to be solved in present invention is to provide a device and method for eliminating narrow-band interference by way of windowing in a spread spectrum system, reducing adverse impacts of spectrum leakage on the capability for suppressing narrow-band interference.

In order to solve the above technology problem, the present invention provides a method for eliminating narrow-band interference by way of windowing in a spread spectrum system, which comprises following steps of:

(a) extracting N sampling points of data to perform frequency spectrum transform each time, and obtaining N points of data;

Then performing control information update and interference elimination processing respectively, wherein the control information update comprises the following steps of:

(b) for the N sampling points within a set time period, getting the energy accumulation of data after transform for M times to obtain N energy values, comparing the N energy values with a threshold that is computed based on the these values, and then determining the number of narrow-band interferences as well as the width and location of each narrow-band interference, $M \geq 1$;

(c) determining the width, location and shape of corresponding frequency domain adjusting window based on the width and location of each narrow-band interference, determining the points included in the window and obtaining the adjusted value of each point;

The interference elimination processing comprises the following steps of:

(b') for the N points of data after frequency spectrum transform each time, based on the obtained points within each window and the information of adjusted value of each point during current time period and the last period, setting the energy values of the data at these points as the corresponding adjusted values and finally performing frequency spectrum inverse transform for those adjusted values, then outputting them.

Additionally, the above method also possesses the following characteristic: in step (b), said threshold value is obtained by multiplying the minimum of said N energy values with a coefficient or it is obtained as follows: removing partial maximum energy values from said N energy values and averaging the rest, then multiplying the average value with a coefficient.

Additionally, the above method also possesses the following characteristic: in step (b), if the energy value at a certain data point is larger than the threshold, then this point is considered as an interference point. Each group of consecutive interference points constitutes one narrow-band interference, and the number of interference points included in the narrow-band interference is considered as the width of this narrow-band interference by which the number of narrow-band interferences, as well as the width and location of each narrow-band interference in this data spectrum are determined.

Additionally, the above method also possesses the following characteristic: in step (b), M is determined by the number of sampling cycles included in a time period, and this time period is of 60-120 ms.

Additionally, the above method also possesses the following characteristic: in step (c), the shape of said window is determined in the following way: with the prescient energy concentration degree of the narrow-band interference signals, if the interference energy is concentrated, then a window with a steep edge is to be selected; if the interference energy is scattered, then a window with a slow-changing edge is to be selected.

Additionally, the above method also possesses the following characteristic: in step (c), the adjusted values of the points within the window are set according to the noise level. The adjusted values of interference points are set as the noise level and the adjusted values of other points around window edge are set as the multiples of the noise level.

The device for eliminating narrow-band interference by means of windowing in a spread spectrum system provided by the invention comprises a frequency spectrum transform unit, an interference elimination unit, an interference elimination control unit and a frequency spectrum inverse transform unit, wherein:

the frequency spectrum transform unit is used to perform frequency spectrum transform for the data of one-time-extracted N sampling points, obtain the spectrum of the data and output the transformed data into the interference elimination unit and the interference elimination control unit;

the interference elimination control unit is used to get N energy values obtained from energy accumulation of data after transform for M times of N sampling points within a set time period, and compare the N energy values with the threshold obtained from these values, and then determine the number of narrow-band interferences as well as the width and location of the interference based on the comparison result, choose one window for each narrow-band interference and obtain the information of the points included in the window as well as the adjusted values of those points, and finally output them to the interference elimination unit;

the interference elimination unit is used as follows: for the N points of data after frequency spectrum transform each time, based on the information of the obtained points included in each window and the adjusted value of each point during the current time period and the last period, it can set the energy values of the data at these points as the corresponding adjusted values, which will finally be sent to the frequency spectrum inverse transform unit;

the frequency spectrum inverse transform unit is used to perform frequency spectrum inverse transform for the N points of data output from interference elimination unit and then output them.

Furthermore, the above device also possesses the following characteristics: said interference elimination control unit further comprises an energy computation subunit, a threshold computation subunit, an interference determination subunit and a window selection unit, wherein:

the energy computation subunit is used to compute N energy values from the energy accumulation of data after transform for M times for N sampling points within a set time period, and then output them to the threshold computation subunit and the interference determination subunit, M is an integer which is $\geq 1$;

the threshold computation subunit is used to compute the threshold for interference determination based on said N energy values and then output the threshold to the interference determination subunit;

the interference determination subunit is used to compare said N energy values with said threshold, define the point whose energy value is larger than the threshold as the interference point (consecutive interference points constitute one narrow-band interference), determine the number of the narrow-band interferences as well as the width and location of each interference, finally output the above information to the window selection unit;

the window selection unit is used to select a suitable frequency domain adjusting window for each narrow-band interference based on the narrow-band interference information output from the interference determination subunit, output the information of the points within each window and adjusted value of each point to the interference elimination unit.

Additionally, the above device also possesses the following characteristics: when said threshold computation subunit calculates the threshold, it multiplies the minimum of said N energy values with a coefficient, or the threshold is obtained as follows: removing partial maximum energy values from said N energy values and averaging the rest, then multiplying the average value with a coefficient.

Additionally, the above device also possesses the following characteristics: when the window selection unit sets the adjusted values of the points within the window, it sets the adjusted values of interference points as the noise level and sets the adjusted values of other points around window edge as the multiples of the noise level.

The present invention is targeted for eliminating the narrow-band interference in a spread spectrum communication system and it processes the signals within the frequency domain. The employed narrow-band interference elimination processing method uses windowing processing to suppress the data and it processes not only the data exceeding the threshold, but the neighboring data as well. The method is very flexible and it can also adjust the window shape according to different interference characteristics. The method of the present invention weakens the impacts of the spectrum leakage on the capability for suppressing narrow-band interference, thus efficiently improving the capability for suppressing narrow-band suppression.

DESCRIPTION OF DRAWINGS

FIG. 3 is a schematic diagram of the notch processor in FIG. 2.

FIG. 4A and FIG. 4B are schematic diagrams of the shapes of two windows.

PREFERRED EMBODIMENTS OF THE INVENTION

The present invention will be further described with reference to the figures and embodiments.

Figure 1:
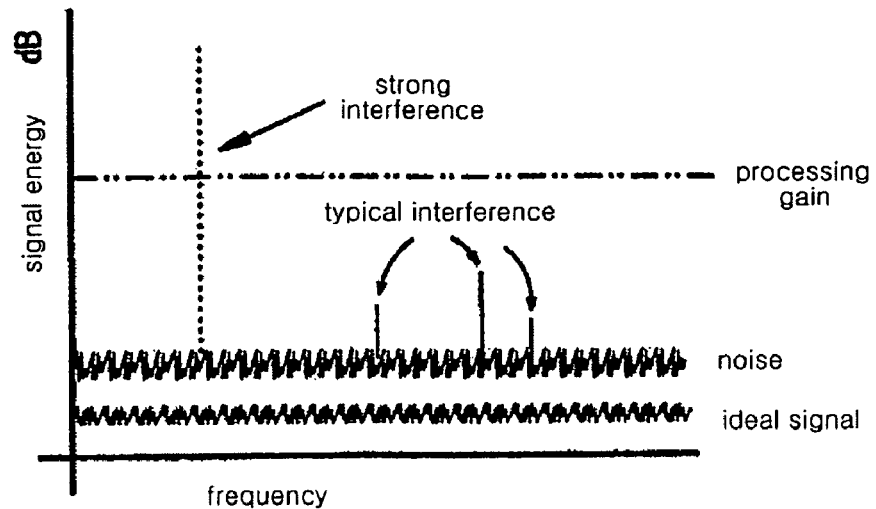
FIG. 1 is a schematic diagram of the spectrum energy for general spread spectrum signals.
Figure 2:
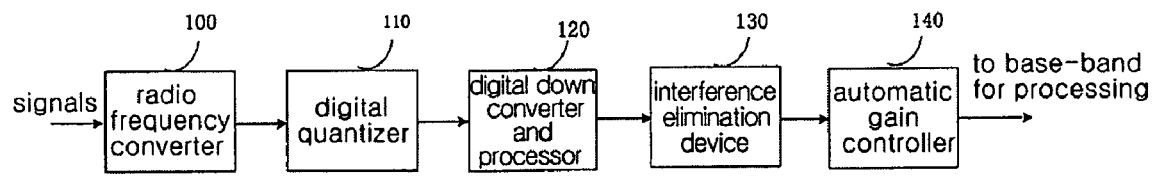
FIG. 2 is a schematic diagram of the operation of the device for processing received signals in accordance with the embodiment of the present invention.

FIG. 2 is schematic diagram of the operation of the device for processing received signals in accordance with the embodiment of the present invention. It comprises a radio frequency converter 100, a digital quantizer 110, a digital down converter and processor 120, an interference elimination device 130, and an automatic gain processor 140.

The signals are received by the radio frequency converter 100 and converted into digital signals after being sampled by digital quantizer 110, then the signals are input to the digital down converter and processor 120 to become intermediate frequency (IF) signals. The output IF signals will be input into the interference elimination device 130 for interference elimination processing, and after the interference is suppressed, the data will be sent to the automatic gain processor 140 for automatic gain control and finally be transmitted to the base-band for processing.

For the design of the location of interference elimination device 130, the device can either be placed before the automatic gain controller 140 or at the place of base-band processing. In the present embodiment, it is chosen to be placed before the automatic gain controller 140. The reason is that with the existence of the narrow-band interference, the signal energy will far exceed the normal value and prohibit the automatic gain controller 140 from performing ordinary gain control as it for non-interference signals, and when the interference is very large, it will be in saturation status and stop working. Therefore the selection of the location for interference elimination device 130 is a key factor in the design.

The above figure is only an example, and in fact other devices can also be added between individual devices.

FIG. 3 shows the diagram of the interference elimination device 130 in FIG. 2, and it comprises the following units:

a frequency spectrum transform unit 200 used to perform frequency spectrum transform for the data of one-time-extracted N sampling points, obtain the data spectrum and output the transformed data into the interference elimination unit and the interference elimination control unit;

an interference elimination control unit 230 used to determine the number of narrow-band interferences as well as the width and location of each interference in a set period of time according to the comparison result between the N energy values obtained from energy accumulation of data after transform for M times of N sampling points and the threshold that is computed from these values, choose a window for each narrow-band interference and obtain the information of the points in each window and adjusted values of each point, finally output them to the interference elimination unit; the detailed calculation method will be introduced in the following;

an interference elimination unit 210 used to perform windowing for the N points of data after frequency spectrum transform each time, based on the obtained information of points in each window and adjusted value of each point during the current time period and the last period, set the energy values of the data at these points as the corresponding adjusted values, and finally send the data after interference suppression to frequency spectrum inverse transform unit;

a frequency spectrum inverse transform unit 220 used to perform frequency spectrum inverse transform for the N points of data output from the interference elimination unit and then output them;

The interference elimination control unit 230 further comprises the following parts:

an energy computation subunit 231 used to get N energy values obtained from energy accumulation of data after transform for M times for N sampling points within a set time period, and then output them to the threshold computation subunit and the interference determination subunit, wherein M is an integer that is $\geq 1$;

a threshold computation subunit 232 used to compute a threshold for interference determination based on said N energy values and then output the threshold to the interference determination subunit;

an interference determination subunit 233 used to compare said N energy values with said threshold, define the point whose energy value is bigger than the threshold as the interference point (consecutive interference points constitute one narrow-band interference) and determine the number of narrow-band interferences as well as the width (represent by points) and location of each interference, finally output the above information to the window selection unit 234;

a window selection unit 234 used to select a suitable frequency domain adjusting window for each narrow-band interference based on the information of the narrow-band interference and prescient characteristics of narrow-band signals output from the interference determination subunit, output the information of points within each window and adjusted value of each point to the interference elimination unit. Generally speaking, the adjusted values of interference points are set as the noise level and the adjusted values of other points are set as multiples of the noise level.

Based on the above interference elimination device, the method in present embodiment for eliminating narrow-band interference by means of windowing in a spread spectrum system comprises the following steps of:

step 1, extracting N sampling points of data to perform frequency spectrum transform each time and obtaining N points of data;

then performing control information update and interference elimination processing at the same time, wherein the control information update comprises the following steps of:

step 2, determining the number of narrow-band interferences as well as the width and location of these interferences based on the result of the comparison between the N energy values obtained from energy accumulation of data after transform for M times on N sampling points within a set time period and the threshold computed from these values, wherein M is an integer that is $\geq 1$;

Accumulation can make the estimated result to be more approximate to the real power spectrum and therefore reflect data characteristics more actual. The duration of accumulation time period should, on one hand, guarantee the power spectrum obtained in the accumulation time period is stable, so the duration should not be too short, and on the other hand, guarantee that the characteristics of the narrow-band interference will not change dramatically within this time period, so the duration should not be too long. A period of 60-120 ms can be chosen.

When computing the threshold, it can be done by choosing the minimum within all the energy values and multiplying it with a coefficient of 2-4, or by removing partial maximum values and averaging the rest, then taking the value that is 3-3.5 times of the average value as the threshold. Both of these two methods can avoid the impacts of excessive large energy values at narrow-band interference points on the threshold computation. However the present invention does not define the threshold computation.

If the energy value at a certain data point exceeds the threshold, it is believed that narrow-band interference exists at this point (represents the frequency location) and it is called interference point in the text. Each group of consecutive interference points constitute one narrow-band interference and the number of interference points included in each narrow-band interference represents the width of the narrow-band interference.

Step 3, based on the width, location and characteristics of each narrow-band interference, determining the width, location and shape of the corresponding frequency domain adjusting window and obtaining the points included in each window, and also determining adjusted value of each point based on the noise level;

The width of frequency domain adjusting window is determined by the width of narrow-band interference. In the present embodiment, the width of the window is chosen as 2-3 times of the interference width. The window can be divided into a narrow-band interference part and fringe parts at each sides of the narrow-band interference. In order to keep both sides symmetric, the differences (indicated by the number of the points) between window width and interference width should be even when determining the window width.

Sometimes, the characteristics of narrow-band interference (for example, the roll-off characteristic, amplitude) can be pre-determined, for example, by the result of the spectrum scanner, it is to determine whether its energy is concentrated or it has a steep edge. One way to determine if the energy is concentrated or not is as follows: if the interference width is equal to 1, then it is directly determined that the interference energy is relatively concentrated; if the interference width is larger than one and the ratio of the maximum energy value to the minimum of the interference is bigger than 0.707, then it also means that the interference energy is relatively concentrated; otherwise, it belongs to the status that the comparison energy is relatively scattered. All these determination rules can be set by oneself and the present invention is not limited to a certain rule.

The window shape is chosen based on the characteristics of the narrow-band interference. If the narrow-band interference energy is relatively concentrated, then the interference edge will be steeper, therefore, a window with a steep edge can be chosen; if the narrow-band interference energy is relatively scattered, then the interference edge changes slowly, therefore, a window with a slow-changing edge can be chosen; if there are many types of interferences or the show-up time is uncertain, which leads to the unpredictable characteristics of the interference signal, a window with the edge characteristics somewhere in between can be chosen. FIG. 4A and FIG. 4B give the examples of the two windows. The FIG. 4A shows a reverse trapezoidal window, which is more suitable for the situation where the interference edge is relatively steeper. The window in FIG. 4B is more suitable for the situation that the interference edge changes slowly. The method for choosing window shape based on the characteristics of the narrow-band interference can employ the current technology.

When determining the adjusted values of the points within the window, the present embodiment sets the adjusted values of interference points as noise level, and sets the adjust values of other points around window edges as the multiples of noise level, wherein the specific multiples will be determined by the window shape; for example, when setting the multiples at the window base as 1 and the multiples at window top as 2, if the width and the shape of every part of the window are known, then it can easily compute the relative value at individual point. The noise level can be obtained either by dividing the minimum within said N energy values by the accumulation times or dividing the average value of the rest energy values after removing the maximum ones from N energy values by the accumulation times. Other than that, we can use other current methods as well.

After step 1, executing the following steps of interference elimination process at the same time:

step 2' for the N points of data after frequency spectrum transform each time, based on the information of the obtained points within each window and adjusted value of each point during the last time period and current period, setting the energy values of the data at these points as the corresponding adjusted values, namely performing windowing for the areas subjected to interference, and therefore suppressing the interference;

When obtaining the window information for the current time period, M is usually set as 1. After taking out N points of data, the corresponding window information is computed based on these data and then windowing is performed for these data, instead of using in the next round of data processing. At this time, the data processing of the N points is performed after the current window information computation. However on the whole, the window information computation and data suppression are operating in parallel. In the present embodiment, for the duration time of narrow-band interference, it will not introduce adverse impacts when processing the data of the next time period by using the window information in the current period.

Step 3', performing frequency spectrum inverse transform for the adjusted data, and outputting them as the data result, ending.

The purpose of present invention is to eliminate the narrow-band interference in the spread spectrum communication system and it processes the signals within the frequency domain. The employed narrow-band interference elimination processing method uses windowing to suppress the data and it processes not only the data exceeding the threshold, but the nearby data as well. The method is very flexible and it can also adjust the window shape based on the different interference characteristics. The method of the present invention weakens the impacts of the spectrum leakage on the capability for suppressing narrow-band interference and as a result, efficiently improves the capability for suppressing narrow-band interference.

Based on the above embodiment, the present invention can also perform various modifications and changes, which should be within the scope defined by the present claim. For example, when suppressing the energy values of the interference data, the values can also be set as zero, however, it will damage the original data greatly.

INDUSTRIAL APPLICABILITY

The present invention has already been realized in the cdma_20001x backward link. After the simulation, in the case of the existences of both large energy narrow-band interference and a plurality of narrow-band interferences, it greatly increases the suppression capability of the narrow-band interference suppression system and improves the performance of the system. The present invention is a common technology, and can be used in the technology for eliminating narrow-band interference in spread spectrum system.

What we claim is:

1. A method for eliminating narrow-band interference by way of windowing in a spread spectrum system, comprising the following steps of:
    (a) extracting N sampling points of data to perform frequency spectrum transform, in order to obtain N points of data after frequency spectrum transform each time, wherein N is the number of the points and is an positive integer;
    then performing control information update and interference elimination processing respectively, wherein the control information update comprises the following steps of:
    (b) for the N sampling points within a set time period, getting an energy accumulation of individual data after transform for M times and obtaining N energy values, comparing the N energy values with a threshold that is computed from the energy values, and then determining the number of narrow-band interferences as well as width and location of each narrow-band interference, M≧1;
    (c) determining width, location and shape of corresponding frequency domain adjusting window and determining points included in the window and adjusted values of the points based on the width and location of each narrow-band interference;
    the interference elimination processing comprises the following steps of:
    (b') for the N points of data after frequency spectrum transform each time, based on the information of obtained points included in each window and adjusted value of each point during the current time period and the last period, setting energy values of the data at these points as the corresponding adjusted values and finally performing frequency spectrum inverse transform for those adjusted values, then outputting them;
    wherein in step (c), the window shape is determined as follows: with prescient energy concentration degree of narrow-band interference signals, if interference energy is concentrated, then a window with a steep edge is selected; if the interference energy is scattered, then a window with a slow-changing edge is selected.

2. The method in claim 1, wherein in step (b), said threshold value is obtained by multiplying the minimum of said N energy values with a coefficient or is obtained as follows: removing partial maximum energy values from said N energy values and averaging the rest, then multiplying the average value with a coefficient.

3. The method in claim 1, wherein in step (b), if the energy value of the data of a certain point is larger than the threshold, then this point is considered as interference point (each group of consecutive interference points constitutes one narrow-band interference) and the number of interference points included in the narrow-band interference is considered as the width of this narrow-band interference and therefore the number of narrow-band interferences as well as width and location of each narrow-band interference in this data spectrum are determined.

4. The method in claim 1, wherein in step (b), M is determined by the number of sampling cycles that are included in a time period, and the time period is of 60-120 ms.

5. The method in claim 1, wherein in step (c), the adjusted values of the points within the window are set according to noise level, it sets the adjusted values of interference points as the noise level and sets the adjusted values of other points around window edge as multiples of the noise level.

6. A device for eliminating narrow-band interference by way of windowing in a spread spectrum system, characterized in that the device comprises a frequency spectrum transform unit, an interference elimination unit, an interference elimination control unit and a frequency spectrum inverse transform unit, wherein:
    the frequency spectrum transform unit is used to perform frequency spectrum transform for the one-time-extracted N points of sampling data, obtain spectrum of the data and output the data into the interference elimination unit and the interference elimination control unit;
    the interference elimination control unit is used to get N energy values obtained from energy accumulation of data after transform for M times on N sampling points within a set time period, and compare the N energy values with a threshold computed from these values, and then determine the number of narrow-band interferences as well as the width and location of these interference based on the comparison result, choose a window for each narrow-band interference and obtain the information of the points included in the window as well as the adjusted values of those points, finally output the information to the interference elimination unit;
    the interference elimination unit is used as follows: for the N points of data after frequency spectrum transform each time, based on the obtained information of points included in each window and adjusted value of each point during current time period and the last period, it sets energy values of the data at these points as the corresponding adjusted values that will finally be sent to the frequency spectrum inverse transform unit;
    the frequency spectrum inverse transform unit is used to perform frequency spectrum inverse transform for the N points of data output from the interference elimination unit and then output them;
    wherein a shape of the window is determined as follows: with prescient energy concentration degree of narrow-band interference signals, if interference energy is concentrated, then a window with a steep edge is selected; if the interference energy is scattered, then a window with a slow-changing edge is selected.

7. The device in claim 6, characterized in that said interference elimination control unit further comprises of an energy computation subunit, a threshold computation subunit, an interference determination subunit and a window selection unit, wherein:
    the energy computation subunit is used to get N energy values obtained from energy accumulation of data after transform for M times on N sampling points within a set time period, and then output said N energy values to the threshold computation subunit and the interference determination subunit, M is an integer that is bigger or equal to 1;
    the threshold computation subunit is used to compute a threshold for interference determination based on said N energy values and then output the threshold to the interference determination subunit;
    the interference determination subunit is used to compare said N energy values with said threshold, consider a certain point whose energy value is larger than the threshold as an interference point (consecutive interference points constitute one narrow-band interference) and determine the number of the narrow-band interference as well as the width and location of each interference, finally output the above information to the window selection unit;

the window selection unit is used to select a suitable frequency domain adjusting window for each narrow-band interference based on the information of the narrow-band interference output from interference determination subunit, output the information of the points included in each window as well as the adjusted value of each point to the interference elimination unit.

8. The device in claim 7, wherein when said threshold computation subunit computes the threshold, it multiplies the minimum of said N energy values with a coefficient or the threshold is obtained as follows: removing partial maximum energy values from said N energy values and averaging the rest, then multiplying the average value with a coefficient.

9. The device in claim 7, wherein when the window selection unit sets the adjusted values for the points within the window, it sets the adjusted values of interference points as the noise level and sets the adjusted values of other points around window edge as the multiples of the noise level.

* * * * *